United States Patent
Huang et al.

(10) Patent No.: US 8,405,317 B2
(45) Date of Patent: Mar. 26, 2013

(54) METHOD FOR INITIATING AND CONTROLLING A LIGHTING EQUIPMENT

(75) Inventors: Cheng-Hung Huang, Gueishan Township, Taoyuan County (TW); Chia-Liang Zhuo, Gueishan Township, Taoyuan County (TW); Shih-Yi Chuang, Gueishan Township, Taoyuan County (TW)

(73) Assignee: Everspring Industry Co., Ltd., Taoyuan County (TW)

( * ) Notice: Subject to any disclaimer, the term of this patent is extended or adjusted under 35 U.S.C. 154(b) by 907 days.

(21) Appl. No.: 12/534,116

(22) Filed: Aug. 1, 2009

(65) Prior Publication Data

US 2010/0084989 A1  Apr. 8, 2010

(30) Foreign Application Priority Data

Oct. 2, 2008 (TW) ................................. 97137872 A

(51) Int. Cl.
*H05B 41/36* (2006.01)
(52) U.S. Cl. .................... 315/246; 315/209 R; 315/291; 315/307; 315/308; 315/DIG. 4
(58) Field of Classification Search ............. 315/200 R, 315/209 R, 246, 291, 307, 308, DIG. 2, DIG. 4, 315/DIG. 5
See application file for complete search history.

(56) References Cited

U.S. PATENT DOCUMENTS

| | | | | |
|---|---|---|---|---|
| 3,935,505 A | * | 1/1976 | Spiteri ........................... | 315/194 |
| 4,904,906 A | * | 2/1990 | Atherton et al. ............... | 315/291 |
| 6,133,696 A | * | 10/2000 | Tavares et al. ................. | 315/194 |
| 7,507,001 B2 | * | 3/2009 | Kit ................................. | 362/276 |
| 2007/0120806 A1 | * | 5/2007 | Schmidt et al. ................ | 345/102 |
| 2011/0309759 A1 | * | 12/2011 | Shteynberg et al. ........... | 315/201 |

* cited by examiner

*Primary Examiner* — Douglas W Owens
*Assistant Examiner* — Thai Pham
(74) *Attorney, Agent, or Firm* — Jackson IPG PLLC

(57) ABSTRACT

The present invention primarily relates to a method for initiating and controlling a lighting equipment by detecting and determining through an algorithm whether a flicker of light may occur during the period of initiating or dimming the lighting equipment. The method further calculates to obtain a current compensation ratio that the current level need be elevated to prevent the occurrence of flicker and performs a real-time compensation for the electrical current, when necessary. The method according to the invention will initiate the lighting equipment at an electrical current level used during a previous stable operation of the lighting equipment, so as to further prevent the occurrence of flicker of light during the initiation of the lighting equipment and achieve the energy saving purpose.

3 Claims, 5 Drawing Sheets

METHOD FOR INITIATING AND CONTROLLING A LIGHTING EQUIPMENT

BACKGROUND OF THE INVENTION

1. Field of the Invention

The present invention relates to technology useful for initiating and controlling a lighting equipment. The invention is meant to provide an initiating and controlling method that is capable of effectively preventing a lighting equipment from the occurrence of flicker of light during its use or in its initiating process.

2. Description of the Prior Art

Since the light sources utilized in the conventional lighting equipments (such as incandescent bulbs and energy-efficient bulbs) normally operate at a power level according to the specification required by the original manufacturers, many of the lighting equipments are additionally provided with light dimmers that modulate the overall power load of the lighting equipments in such a timely manner that enables the lighting equipments to meet the actual brightness requirement and to achieve the energy saving purpose. However, when a dimmer is used to modulate the power load of a lighting equipment, a flicker of light would often occur due to the change in waveforms.

Moreover, the conventional lighting equipments normally have the problem of flicker of light due to current fluctuation, irrespective of being provided with a dimmer or not. While the problem is particularly serious during the procedure of initiating a lighting equipment, it will occur at any moment during the operation of the lighting equipment, resulting in a deterioration of the illumination quality and causing eye fatigue and even visual degeneration of a user.

SUMMARY OF THE INVENTION

Accordingly, an object of the invention is to provide an initiating and controlling method that is capable of effectively preventing the occurrence of flicker of a lighting equipment during the use of the lighting equipment or in a process of reinitiating the light equipment.

In order to achieve this object, the method according to the invention samples consecutive alternative current (AC) wave peaks supplied from an AC power source to a lighting equipment during the period of initiating or dimming the lighting equipment and then analyzes the sampled data through an algorithm to determine whether a flicker of light may occur. The current compensation ratio that the current level need be elevated to prevent the occurrence of flicker is further calculated for performing a real-time compensation for the electrical current. Moreover, when the lighting equipment is activated next time, it will be initiated at an electrical current level used during a previous stable operation of the lighting equipment (i.e., no flicker of light), so as to further prevent the occurrence of flicker of light.

One of the advantages that the invention has is to actively detect and determine through an algorithm whether a flicker of light may occur and if a flicker of light occurs, performs a real-time current compensation. Therefore, the invention can prevent the occurrence of flicker of light in an active manner.

Another advantage of the invention is to actively detect and determine through an algorithm whether a flicker of light may occur during a dimming operation the lighting equipment and if a flicker of light occurs, performs a real-time current compensation. Therefore, the invention can effectively ameliorate the flicker of light that may occur due to the dimming operation.

A yet another advantage of the invention is to initiate the lighting equipment at an electrical current level used during a previous stable operation of the lighting equipment, so as to further prevent the occurrence of flicker of light during the period of initiating the lighting equipment and achieve the energy saving purpose.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF THE PREFERRED EMBODIMENTS

The present invention primarily relates to a method for initiating and controlling a lighting equipment by detecting and determining through an algorithm whether a flicker of light may occur during the period of initiating or dimming the lighting equipment. The method further calculates to obtain a current compensation ratio that the current level need be elevated to prevent the occurrence of flicker and performs a real-time compensation for the electrical current, when necessary.

Examples of specific methods according to the invention are illustrated as follows:

According to Example 1 of the invention, a method is illustrated for initiating and controlling a lighting equipment that is not provided with a dimmer. The method comprises the steps of:

a. initiating the lighting equipment at a maximum lighting level according to the specification required by the original manufacturer by applying a first electrical current;

b. after the initiating step, detecting and determining through an algorithm whether a flicker of light may occur;

c. if determining that a flicker of light may occur, calculating to obtain a current compensation ratio that the first electrical current must be increased to a second current to prevent the occurrence of flicker and performing immediately a current compensation by applying the second current to prevent the occurrence of flicker; and d. allowing the lighting equipment to stably operate at the second current level and storing the second current level for initiating the lighting equipment next time.

According to Example 2 of the invention, a method is illustrated for initiating and controlling a lighting equipment provided with a dimmer, where the dimmer is not activated to perform a dimming operation. The method comprises substantially the same steps described in Example 1 above, including:

a. determining whether any electrical current level used during a previous stable operation of the lighting equipment is stored and if there is no current level stored, initiating the lighting equipment at a maximum lighting level according to the specification required by the original manufacturer by applying a first electrical current;

b. after the initiating step, detecting and determining through an algorithm whether a flicker of light may occur;

c. if determining that a flicker of light may occur, calculating to obtain a current compensation ratio that the first electrical current must be increased to a second current to prevent the occurrence of flicker and performing immediately a current compensation by applying the second current to prevent the occurrence of flicker; and d. allowing the lighting equipment to stably operate at the second current level and storing the second current level for initiating the lighting equipment next time.

Figure 1:
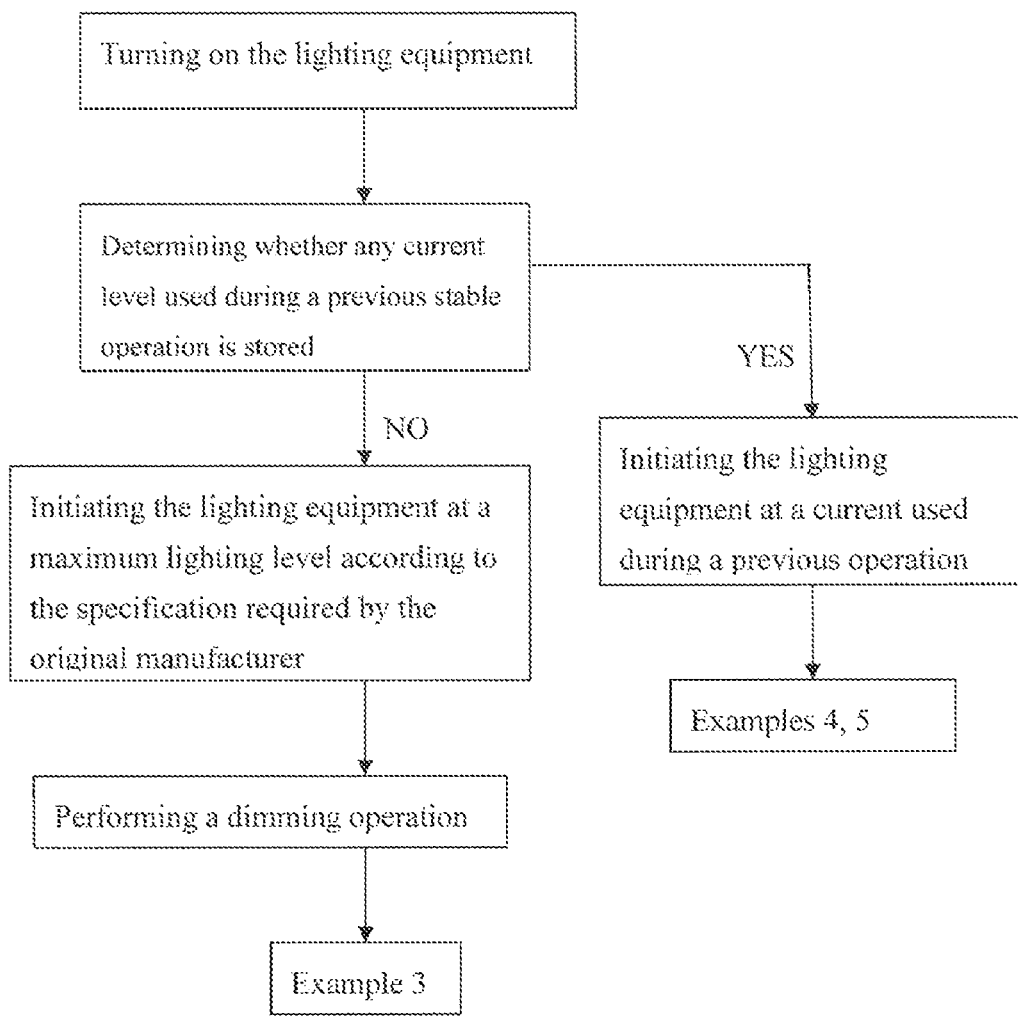
FIG. 1 is a flow chart illustrating an inventive procedure of initiating a lighting equipment.
Figure 2:
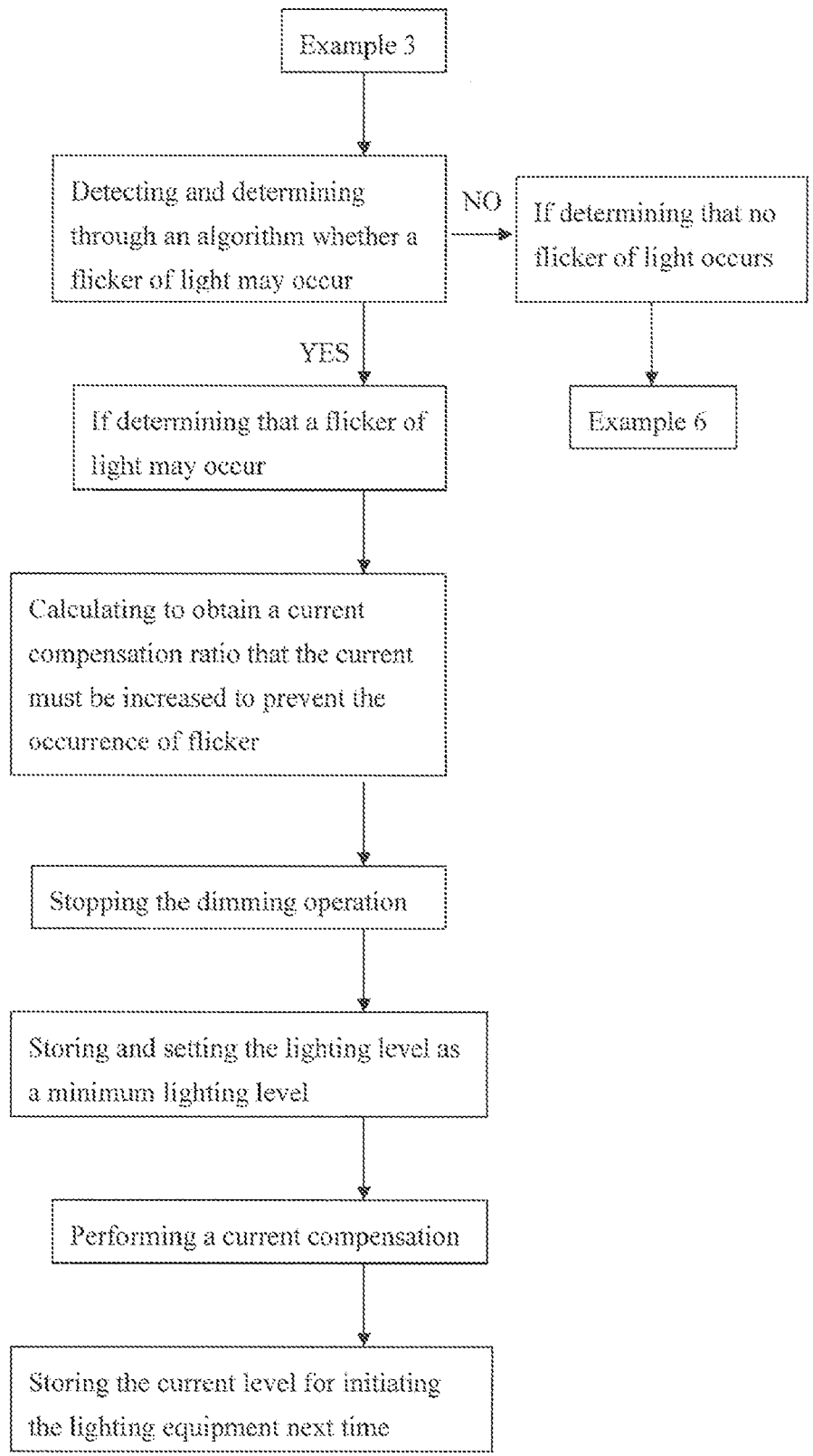
FIG. 2 is a flow chart illustrating an inventive procedure of initiating a lighting equipment at a maximum lighting level according to the specification required by the original manufacturer and then performing a dimming operation.

According to Example 3 of the invention, a method is illustrated for initiating and controlling a lighting equipment provided with a dimmer, where the dimmer is activated to perform a dimming operation. As shown in FIGS. 1 and 2, the method comprises the steps of:

a. determining whether any electrical current level used during a previous stable operation of the lighting equipment is stored and if there is no current level stored, initiating the lighting equipment at a maximum lighting level according to the specification required by the original manufacturer by applying a first electrical current;

b. performing a dimming operation to modulate the power load of the lighting equipment from the first electrical current to a second electrical current using the dimmer and detecting and determining through an algorithm whether a flicker of light may occur;

c. if determining that a flicker of light may occur, storing and setting a lighting level of the lighting equipment provided by the second electrical current as a minimum lighting level;

d. calculating to obtain a current compensation ratio that the second electrical current must be increased to a third current to prevent the occurrence of flicker and performing immediately a current compensation by applying the third current to prevent the occurrence of flicker; and e. allowing the lighting equipment to stably operate at the third current level and storing the third current level for initiating the lighting equipment next time.

Figure 3:
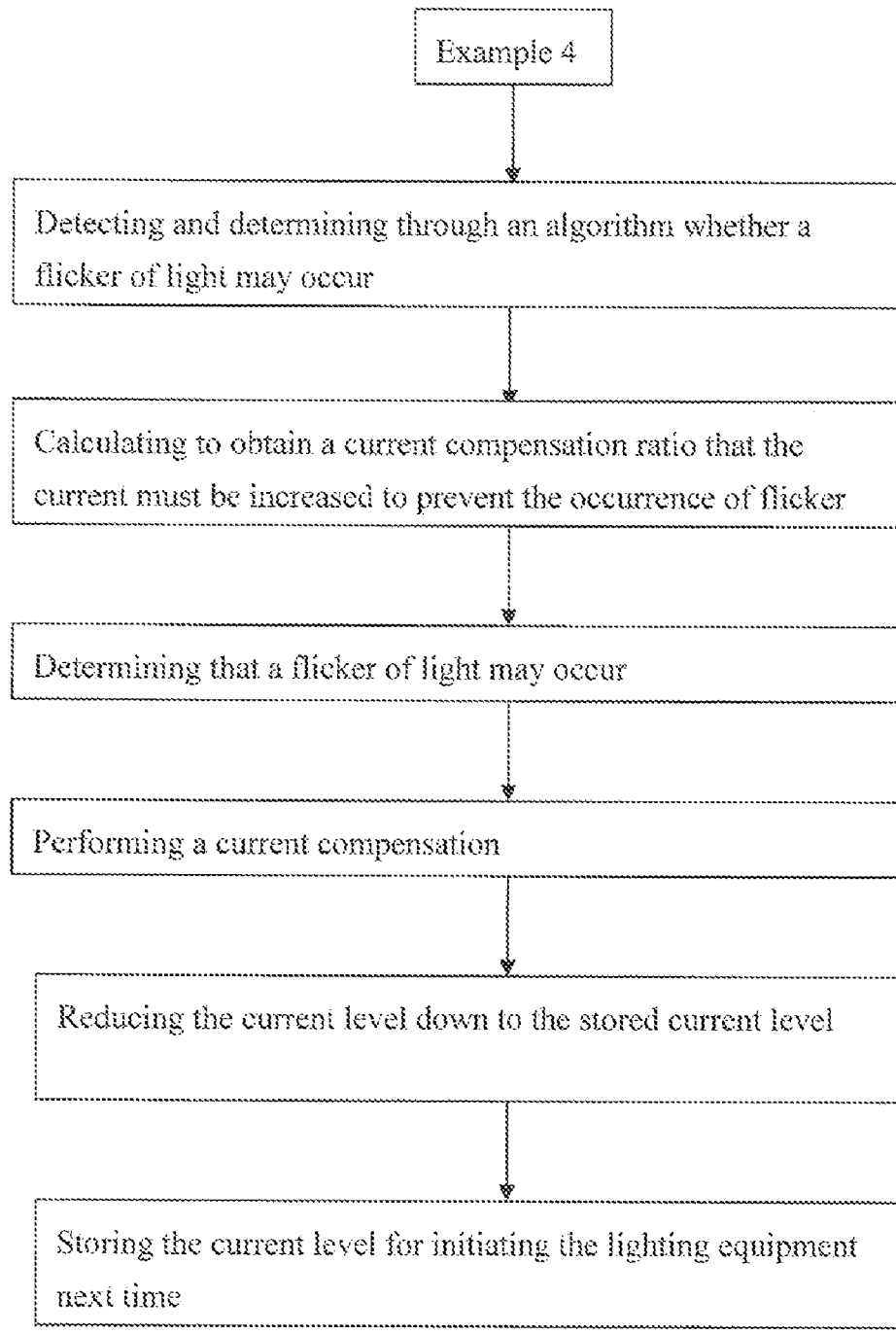
FIG. 3 is a flow chart illustrating an inventive procedure of controlling a lighting equipment initiated at an electrical current level used and stored during a previous stable operation of the lighting equipment.

According to Example 4 of the invention, a method is illustrated for initiating and controlling a lighting equipment provided with a dimmer, wherein the lighting equipment has been dimmed previously using the dimmer and wherein the dimmer is not activated during the method. As shown in FIGS. 1 and 3, the method comprises the steps of:

a. determining whether any electrical current level used during a previous stable operation of the lighting equipment is stored and if there is a first electrical current level stored, initiating the lighting equipment by applying a first electrical current;

b. after the initiating step, detecting and determining through an algorithm whether a flicker of light may occur;

c. if determining that a flicker of light may occur, calculating to obtain a current compensation ratio that the first electrical current must be increased to a second current to prevent the occurrence of flicker and performing immediately a current compensation by applying the second current to prevent the occurrence of flicker;

d. reducing the second current level down to the first current level and allowing the lighting equipment to stably operate at the first current level; and e. storing the first current level for initiating the lighting equipment next time.

Figure 4:
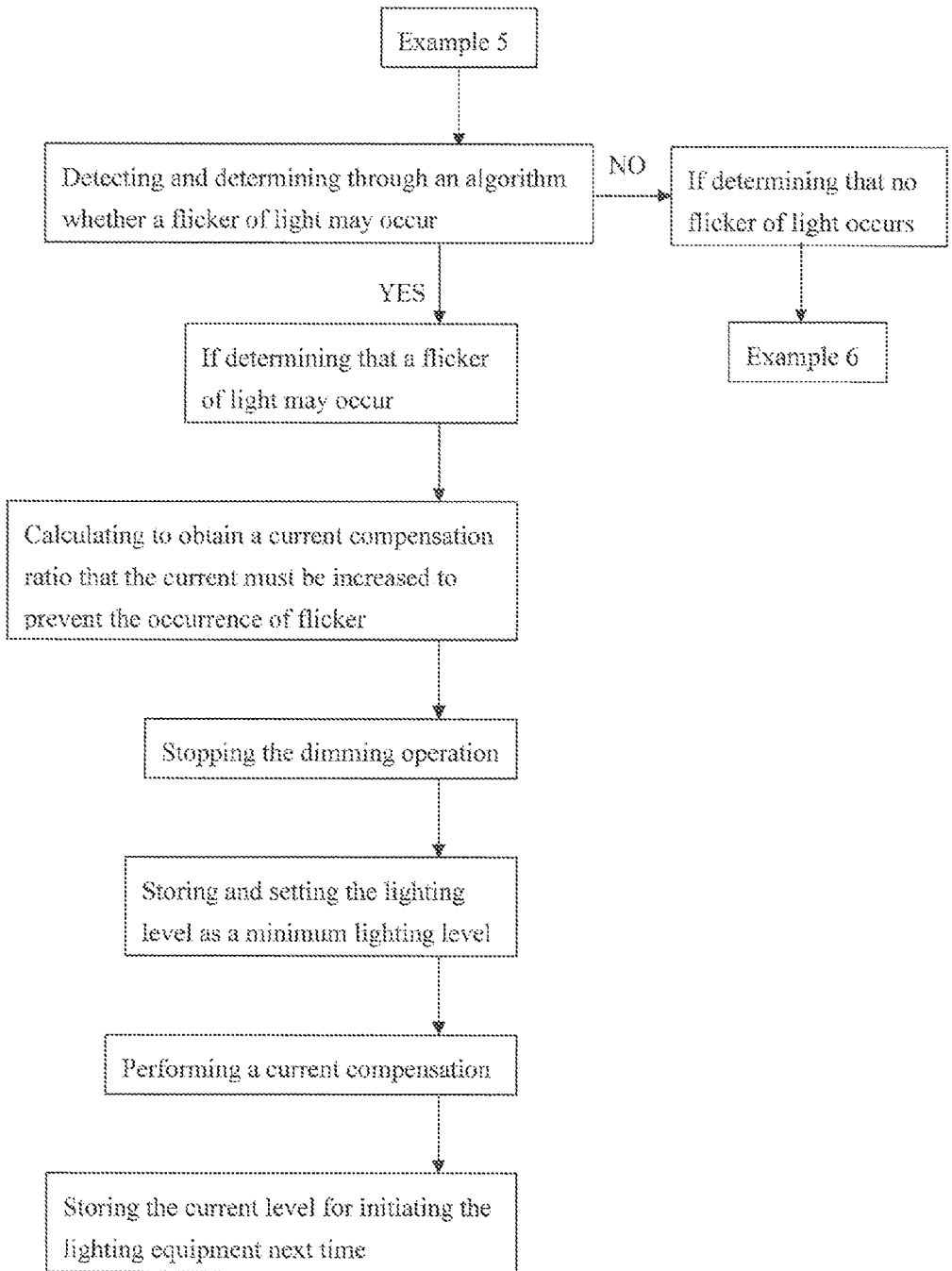
FIG. 4 is a flow chart illustrating an inventive procedure of controlling a lighting equipment initiated at an electrical current level used and stored during a previous stable operation of the lighting equipment and then performing a dimming operation.

According to Example 5 of the invention, a method is illustrated for initiating and controlling a lighting equipment provided with a dimmer, wherein the lighting equipment has been dimmed previously using the dimmer and wherein the dimmer is activated to perform a dimming operation during the method. As shown in FIGS. 1 and 4, the method comprises the steps of:

a. determining whether any electrical current level used during a previous stable operation of the lighting equipment is stored and if there is a first electrical current level stored, initiating the lighting equipment by applying a first electrical current;

b. performing a dimming operation to modulate the power load of the lighting equipment from the first current to a second electrical current using the dimmer and detecting and determining through an algorithm whether a flicker of light may occur;

c. if determining that a flicker of light may occur, storing and setting a lighting level of the lighting equipment provided by the second electrical current as a minimum lighting level and calculating to obtain a current compensation ratio that the second electrical current must be increased to a third current to prevent the occurrence of flicker;

d. performing immediately a current compensation by applying the third current to prevent the occurrence of flicker; and e. allowing the lighting equipment to stably operate at the third current level and storing the third current level for initiating the lighting equipment next time.

Figure 5:
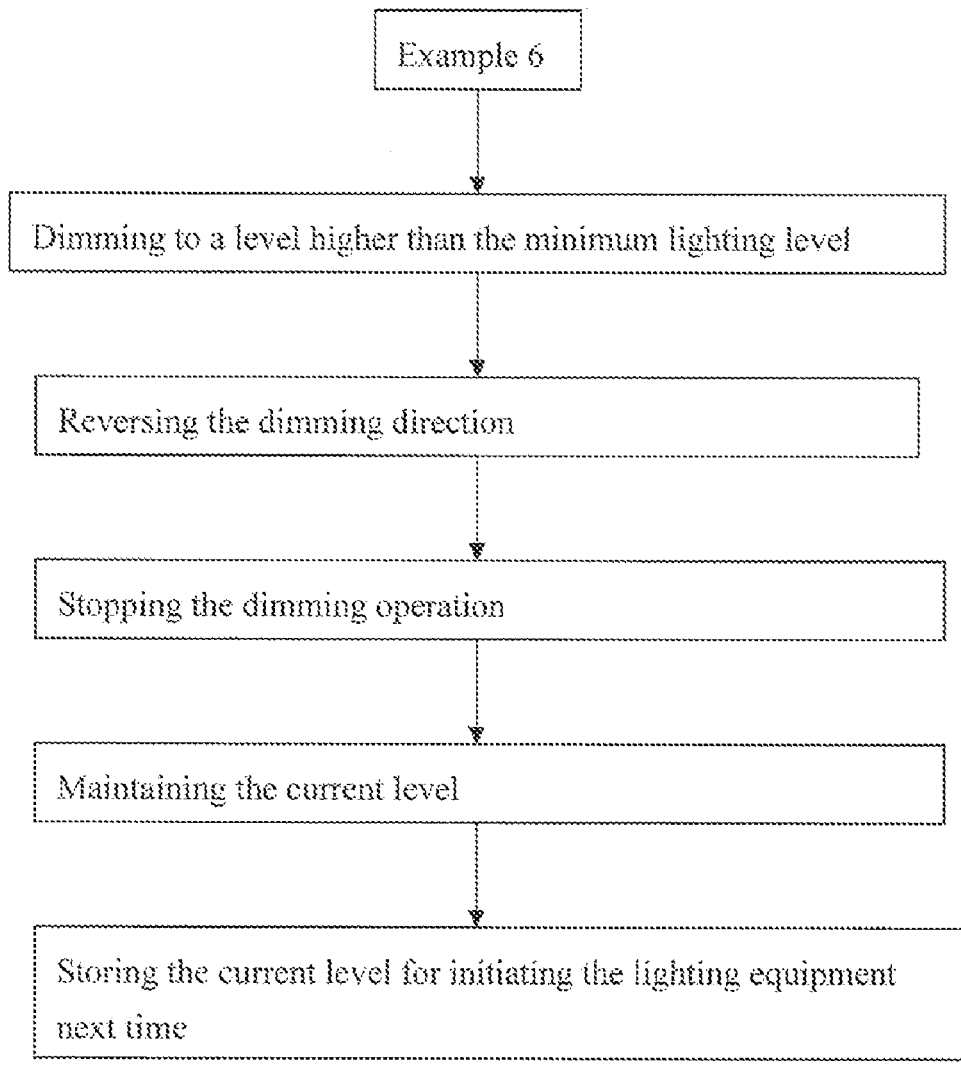
FIG. 5 is a flow chart illustrating an inventive procedure of controlling a lighting equipment which is dimmed to a level higher than a minimum lighting level.

In the initiating and controlling methods of Examples 3 and 5, if the lighting level of the lighting equipment, after being initiated, is dimmed to a level which is higher than the previously stored minimum lighting level and does not result in a flicker of light, the dimming direction would be reversed to the other direction as illustrated in Example 6 shown by FIG. 5. After completion of the dimming operation, the resultant electrical current level is maintained to allow a stable operation of the lighting equipment and further stored for initiating the lighting equipment next time.

In addition, the determination whether a flicker of light occurs can be done by detecting and analyzing consecutive alternative current (AC) wave peaks supplied to the lighting equipment using an analog-to-digital converter (ADC), followed by comparing the maximum peak value with the minimum peak value by an algorithm. If the difference between the maximum peak value and the minimum peak value excesses a certain threshold value, it could determine that a flicker of light may occur; otherwise, no flicker of light occurs. The current compensation ratio that the current level need be elevated to prevent the occurrence of flicker can be further calculated.

It can be seen from the examples given above that the method according to the invention does not only modulate the power load of a lighting equipment to an extent that meets the actual brightness requirement, but also actively detects and determines through an algorithm whether a flicker of light may occur due to the dimming operation and performs a real-time current compensation to effectively ameliorate the flicker of light, if any. The method according to the invention will initiate the lighting equipment at an electrical current level used during a previous stable operation of the lighting equipment, so as to further prevent the occurrence of flicker of light during the initiation of the lighting equipment and achieve the energy saving purpose.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit of the invention and the scope thereof as defined in the appended claims.

What is claimed is:

1. A method for initiating and controlling a lighting equipment, comprising the steps of:
    a. turning on lighting equipment at a maximum lighting level according to specification required by an original manufacturer by applying a first alternating current (AC) current, provided that no first AC current used during a previous stable operation of the lighting equipment is stored;
    b. performing a dimming operation to modulate a power load of the lighting equipment from the first AC current down to a second AC current and detecting whether a flicker of light may occur due to a fluctuation in AC current, wherein the detecting comprises detecting and analyzing consecutive AC wave peaks supplied to the lighting equipment using an analog-to-digital converter, followed by comparing the maximum peak value with the minimum peak value;
    c. if detecting that a flicker of light may occur, storing and setting a lighting level of the lighting equipment provided by the second AC current as a minimum lighting level;
    d. calculating to obtain a current compensation value that the second AC current must be increased to a third AC current to prevent the occurrence of flicker and performing immediately a current compensation by applying the third AC current to prevent the occurrence of flicker; and
    e. allowing the lighting equipment to stably operate at the third AC current and storing the third AC current for initiating the lighting equipment next time.

2. The method for initiating and controlling a lighting equipment according to claim 1, further comprising steps of:
    reversing a dimming direction if the lighting equipment is dimmed during the dimming operation in step b to a level higher than a previously stored minimum lighting level and if it is determined that no flicker of light occurs, and
    maintaining a resultant AC current to allow a stable operation of the lighting equipment and further storing the resultant AC current for initiating the lighting equipment next time.

3. The method for initiating and controlling a lighting equipment according to claim 1, wherein the step a further comprises, before initiating the lighting equipment, determining whether any AC current used during a previous stable operation of the lighting equipment is stored, and, if there is a first AC current stored, initiating the lighting equipment by applying the first AC current.

* * * * *